(12) United States Patent
Kitamura

(10) Patent No.: US 9,028,223 B2
(45) Date of Patent: May 12, 2015

(54) VENTILATION FAN

(75) Inventor: Jumpei Kitamura, Kyoto (JP)

(73) Assignee: Nidec Corporation, Kyoto (JP)

( * ) Notice: Subject to any disclaimer, the term of this patent is extended or adjusted under 35 U.S.C. 154(b) by 624 days.

(21) Appl. No.: 13/293,154

(22) Filed: Nov. 10, 2011

(65) Prior Publication Data

US 2012/0121426 A1    May 17, 2012

(30) Foreign Application Priority Data

Nov. 11, 2010    (JP) .................... 2010-253176

(51) Int. Cl.
| | |
|---|---|
| *F01D 5/14* | (2006.01) |
| *H02K 1/06* | (2006.01) |
| *H02K 5/08* | (2006.01) |
| *F04D 19/00* | (2006.01) |
| *F04D 25/06* | (2006.01) |
| *H02K 1/18* | (2006.01) |
| *H02K 1/30* | (2006.01) |
| *H02K 7/14* | (2006.01) |

(52) U.S. Cl.
CPC .............. *H02K 5/08* (2013.01); *F04D 19/002* (2013.01); *F04D 25/0606* (2013.01); *H02K 1/187* (2013.01); *H02K 1/30* (2013.01); *H02K 7/14* (2013.01)

(58) Field of Classification Search
CPC ......... H02K 1/2706; H02K 5/08; H02K 7/14; H02K 1/30; H02K 1/185; F04D 19/002; F04D 25/0606

USPC ................ 417/44.1, 352, 353, 423.1, 423.14, 417/424.1; 310/68 B, 71, 166.06, 67 R
See application file for complete search history.

(56) References Cited

U.S. PATENT DOCUMENTS

| | | | | |
|---|---|---|---|---|
| 3,914,071 | A * | 10/1975 | Friese | 417/353 |
| 4,549,858 | A * | 10/1985 | Vettori et al. | 417/353 |
| 6,479,914 | B2 * | 11/2002 | Yoshida et al. | 310/81 |
| 2007/0065064 | A1 * | 3/2007 | Kitamura et al. | 384/537 |
| 2007/0085426 | A1 * | 4/2007 | Lee et al. | 310/43 |
| 2009/0180901 | A1 | 7/2009 | Lee et al. | |
| 2009/0196770 | A1 | 8/2009 | Yu et al. | |
| 2010/0073873 | A1 * | 3/2010 | Horng et al. | 361/695 |
| 2011/0103981 | A1 * | 5/2011 | Horng et al. | 417/423.7 |

FOREIGN PATENT DOCUMENTS

CN        101504012 A    8/2009

* cited by examiner

*Primary Examiner* — Peter J Bertheaud
*Assistant Examiner* — Dominick L Plakkoottam
(74) *Attorney, Agent, or Firm* — Keating & Bennett, LLP

(57) ABSTRACT

In a ventilation fan of inner rotor type in which a shaft is fixed to a motor supporting portion, the shaft is held by a shaft holding portion preferably provided by, for example, a metal member. The shaft holding portion includes a cylindrical portion which is fixed to a resin of the motor supporting portion preferably by being embedded through insert molding and into which the shaft is inserted, and a shaft holding flange portion extending outwards in the radial direction from either one of an upper end or a lower end of the cylindrical portion.

16 Claims, 5 Drawing Sheets

VENTILATION FAN

BACKGROUND OF THE INVENTION

1. Field of the Invention

The present invention relates to a ventilation fan and more specifically to a ventilation fan preferably used for cooling electronic equipment, for example, and for other purposes.

2. Description of the Related Art

In recent years, as miniaturization of electronic equipment advances, the density of components in the electronic equipment increases, and thus, the amount of heat generated by the electronic equipment increases. For this reason, a ventilation fan which is mounted on such miniaturized electronic equipment for the purpose of radiating the heat from the electronic equipment is required to be further miniaturized, and to also have a higher cooling ability. In order to satisfy such requirements for the ventilation fan, it is suggested that the rotation speed of the fan may be increased, so as to increase the amount of air flowing through the inside of the electronic equipment.

As a fan motor for driving a conventional ventilation fan, an outer rotor type fan motor in which a rotor magnet is located on the outer side of the stator is often used for the reason of its simple assembling process, among other reasons. However, such an outer rotor type fan motor may possess a strength problem due to the vibration in high-speed rotation because the moment of inertia in rotation is high.

On the other hand, a fan of inner rotor type in which a rotor magnet is located on the inner side of a stator can perform higher speed rotation because the moment of inertia is lower than that of the outer rotor type.

In a general configuration of a conventional fan of inner rotor type, a shaft (a rotation axis), a bearing arranged to support the shaft, a shaft holding portion arranged to hold the bearing, and a rotor holding portion arranged to hold a rotor magnet are provided in this order from the rotation shaft centre to the outside. However, since it is necessary to provide a certain space between the rotor holding portion as a rotating body and the bearing holding portion as a non-rotating body, there is a limit to miniaturization of such a conventional ventilation fan of inner rotor type with the above-described configuration.

SUMMARY OF THE INVENTION

Preferred embodiments of the present invention provide a ventilation fan in which a shaft defining a fixed axis fixed to a motor supporting portion can be stably held even when the fan performs high-speed rotation, and of which the size in the axial direction can be reduced.

In order to overcome the problems described above, in the ventilation fan of inner rotor type according to a preferred embodiment of the present invention in which a shaft is fixed to a motor supporting portion, the shaft is held by a shaft holding portion which is preferably constructed by, for example, a metal member. The shaft holding portion is joined to a resin of the motor supporting portion preferably by, for example, being embedded by insert molding, and the shaft holding portion includes a cylindrical portion into which the shaft is inserted, and a shaft holding flange portion extending from either one of an upper end or a lower end of the cylindrical portion to the outside in a radial direction.

That is, the ventilation fan of a preferred embodiment of the present invention preferably includes a shaft arranged on the shaft center of rotation; a rotor holding portion rotatably supported by the shaft via a bearing; a rotor magnet held on a radially outer surface of the rotor holding portion; a stator arranged opposite to the rotor magnet on the radially outer side of the rotor magnet; an impeller rotating together with the rotor magnet and the rotor holding portion; and a motor supporting portion arranged to support the stator and the shaft; wherein the motor supporting portion preferably includes a base portion, a stator holding portion arranged to hold the stator, and a shaft holding portion arranged to hold the shaft, the base portion is preferably formed from, for example, a resin material, and the stator holding portion and the shaft holding portion are preferably constructed by, for example, metal members, the stator holding portion and the shaft holding portion are joined to the base portion preferably by, for example, being embedded through insert molding, and the shaft holding portion includes a cylindrical portion into which the shaft is inserted, and a shaft holding flange portion extending outwards in the radial direction from either one of an upper end or a lower end of the cylindrical portion.

With the above-described configuration, the shaft is preferably held by a shaft holding portion made of, for example, a metal member, and the shaft holding portion includes a cylindrical portion into which the shaft is inserted and a shaft holding flange portion extending from the cylindrical portion to the outside in the radial direction. Accordingly, even when the ventilation fan performs high-speed rotation, the shaft holding portion can stably hold the shaft, and the holding strength can be maintained.

According to the preferred embodiments of the present invention, even when the ventilation fan performs high-speed rotation, the shaft is stably held to the motor supporting portion through the shaft holding portion. Therefore, it is possible to provide a ventilation fan with minimal vibrations that can also be miniaturized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Referring to FIGS. 1 through 5, preferred embodiments of the present invention will be described in detail. The ventilation fans according to preferred embodiments of the present invention are preferably axial fans in which air flows in a direction along the axial direction. It should be noted that in the following description of preferred embodiments of the present invention, for convenience of explanation, an axial direction indicates a direction parallel or substantially parallel to a shaft center of rotation of the ventilation fan, and a radial direction indicates a direction perpendicular or substantially perpendicular to the shaft center of rotation of the ventilation fan. The air suction side of the ventilation fan is described as being up, and the air exhausting side thereof is described as being down. However, this is merely for convenience of explanation and an installed device could have an air suction side being down and an air exhausting side being up.

Preferred embodiments described below are substantially preferred embodiments, and they do not limit the present invention, the applications thereof, or the range of the usage thereof.

Figure 1:
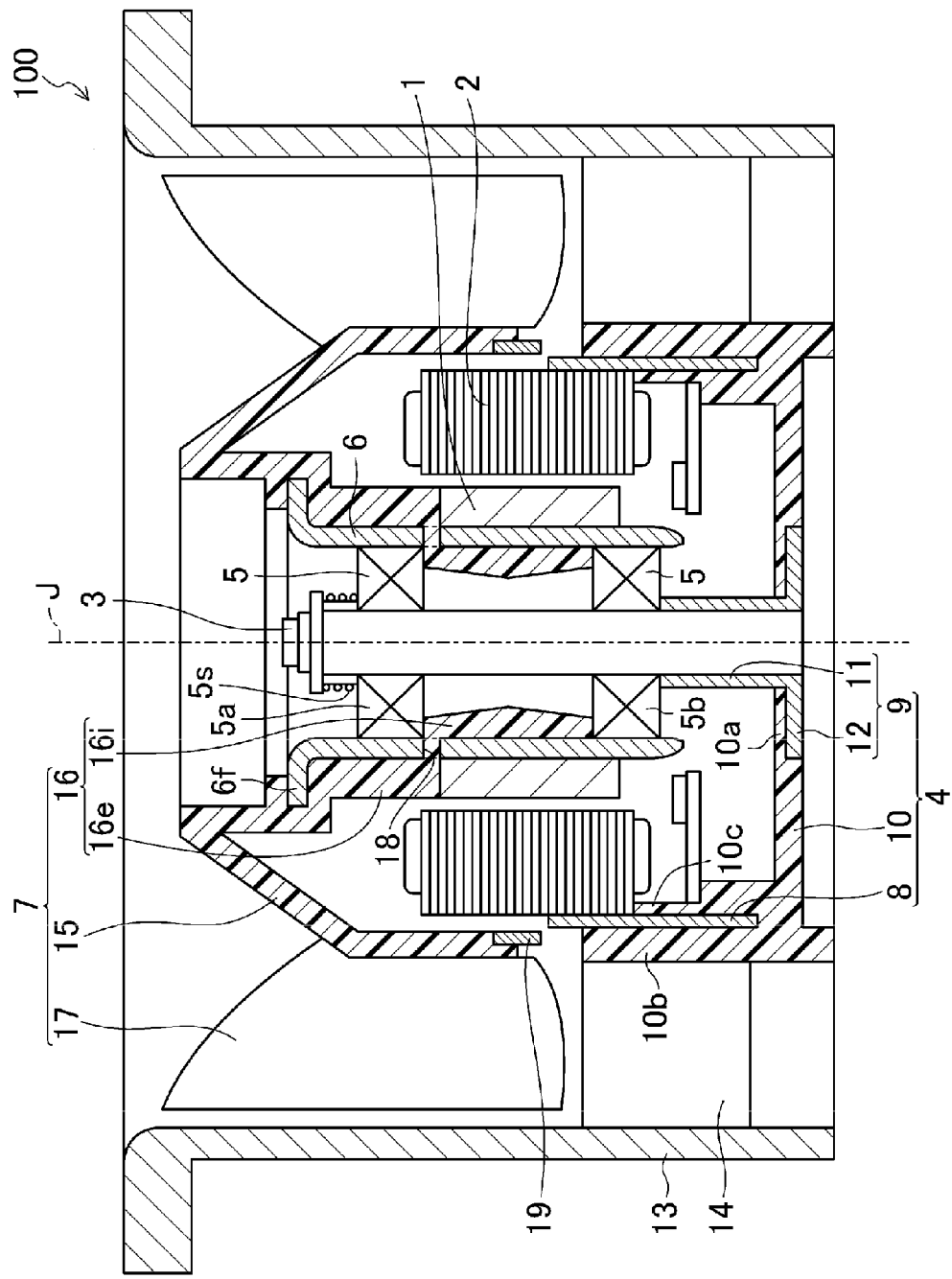
FIG. 1 is a longitudinal sectional view schematically showing the configuration of a ventilation fan of a first preferred embodiment of the present invention.

First, the entire configuration of a ventilation fan 100 of a first preferred embodiment will be described with reference to FIG. 1. FIG. 1 is a longitudinal sectional view schematically showing the configuration of the ventilation fan 100. The letter J in the figure denotes a shaft center of rotation of the ventilation fan 100.

As shown in FIG. 1, the ventilation fan 100 preferably includes a rotor magnet 1, a stator 2 arranged radially opposite to the rotor magnet 1, and a shaft 3 provided on the shaft center of rotation J of the ventilation fan 100 and extending in the axial direction. Both of the rotor magnet 1 and stator 2 preferably have hollow cylindrical shapes extending in the axial direction. An outer diameter of the rotor magnet 1 is smaller than an inner diameter of the stator 2. Specifically, the ventilation fan 100 is a ventilation fan of the so-called inner rotor type in which the rotor magnet 1 is located on an axially inner side than the stator 2.

In a lower portion of the ventilation fan 100, a motor supporting portion 4 is arranged to support the stator 2. The shaft 3 of the ventilation fan 100 is fixed to the motor supporting portion 4 together with the stator 2, so as to rotatably support a rotor holding portion 6 via one or more bearings 5. The rotor holding portion 6 preferably has a hollow cylindrical shape extending in the axial direction. The rotor magnet 1 is fixed to a radially outer surface of the rotor holding portion 6 by, for example, press fitting, adhesion, etc. An impeller 7 is supported in an upper end portion of the rotor holding portion 6. In the rotation of the ventilation fan 100, the impeller 7 rotates together with the rotor magnet 1 and the rotor holding portion 6, so that the air flows in a housing 13 from the side of the impeller 7 to the side of the motor supporting portion 4.

Next, with reference to FIG. 1, respective configurations of the ventilation fan 100 of the first preferred embodiment 1 will be described in more detail.

First, the configuration of the motor supporting portion 4 will be described.

The motor supporting portion 4 has a stator holding portion 8 arranged to hold the stator 2, a shaft holding portion 9 arranged to hold the shaft 3, and a base portion 10 arranged between the stator holding portion 8 and the shaft holding portion 9, thereby coupling them. The base portion 10 of the motor supporting portion 4 is preferably formed from, for example, a resin material. The stator holding portion 8 and the shaft holding portion 9 are preferably provided by, for example, separate metal members. The stator holding portion 8 and the shaft holding portion 9 are preferably respectively formed by, for example.

The stator holding portion 8 and the shaft holding portion 9 are preferably fixed to the base portion 10 by, for example, being embedded through insert molding. With such a configuration, the relative position of the shaft holding portion 9 with respect to the stator holding portion 8 is determined. As a result, the concentricity among the rotor magnet 1, the stator 2, and the shaft 3 held by them can be substantially increased.

The shaft holding portion 9 preferably includes a cylindrical portion 11 into which the shaft is inserted, and a shaft holding flange portion 12 extending radially outwards from a lower end of the cylindrical portion 11. The shaft 3 is fixed to the cylindrical portion 11 preferably by, for example, press fitting or the like. On an upper surface of the shaft holding flange portion 12, a flange stopper 10a is provided by the base portion 10. By including the flange stopper 10a, the coupling strength between the base portion 10 and the shaft holding portion 9 is increased, and the support of the shaft holding portion 9 by the base portion 10 can be ensured.

As described above, in the ventilation fan 100, the shaft 3 is held by the motor supporting portion 4 in a condition where the shaft 3 is fixed to the cylindrical portion 11 of the shaft holding portion 9 made of metal. In addition, since the shaft holding flange portion 12 is defined in a lower end of the cylindrical portion 11 of the shaft holding portion 9, the shaft 3 can be more firmly held than in the case where the shaft 3 is held only by the cylindrical portion 11.

As described above, because the shaft 3 is stably held, even if the rotation vibration of the ventilation fan 100 is transmitted to the shaft 3 via the bearing 5, the vibration is barely transmitted even in the high-speed rotation of the ventilation fan. Accordingly, the ventilation fan 100 has advantages that the vibration in rotation is low, and the noise is low. In addition, in the ventilation fan 100, it is unnecessary to deeply mount the shaft 3 into the motor supporting portion 4, so that it is possible to provide a ventilation fan which is further miniaturized in the axial direction.

In addition, the cylindrical portion 11 is reinforced by the shaft holding flange portion 12, so that it is advantageous to ensure the rigidity of the shaft 3 and the shaft holding portion 9.

On the other hand, the stator holding portion 8 is preferably constructed by the metal member as described above, and has a hollow cylindrical shape extending in the axial direction. In an upper portion of an inner circumference of the stator holding portion 8, the stator 2 is preferably fixed by, for example, press fitting, adhesion, etc.

With such a configuration, since the stator holding portion 8 is provided by the metal member, even if the ventilation fan 100 is rotated for a long time, the heat generated from the stator 2 can be sufficiently radiated. Moreover, since the stator holding portion 8 and the shaft holding portion 9 are coupled by the base portion 10, which is preferably made of resin, the vibration of the ventilation fan 100 can be attenuated due to the members being made of different materials. Accordingly, the vibration transmission from the shaft holding portion 9 to the stator holding portion 8 is prevented and minimized, so that it is advantageous to prevent the vibration of the whole of the ventilation fan 100.

In the vicinity of the stator holding portion 8, the base portion 10 includes an outer joining portion 10b which is joined to an outer circumferential surface of the stator holding portion 8, and an inner joining portion 10c which is joined to an inner circumferential surface of the stator holding portion 8. The outer joining portion 10b of the base portion 10 and the housing 13 of the ventilation fan 100 are coupled by a plurality of coupling members (ribs or stationary blades) 14 provided in a spaced apart manner in a circumferential direction.

With such a configuration, via the coupling member 14, the motor supporting portion 4 can preferably be integrally molded with the housing 13 by being embedded through insert molding, so that the strength of the motor supporting portion 4 can be increased. In addition, when the stator 2 is fixed to the stator holding portion 8, the stator 2 is inserted into the stator holding portion 8 from the above in the figure.

At this time, the lower end of the stator 2 comes into contact with the upper end surface of the inner joining portion 10c, thereby positioning the stator 2 with respect to the housing 13.

At least a portion of a radially outer surface of the stator holding portion 8 is preferably exposed from the outer joining portion 10b. With such a configuration, the heat from the stator 2 can be efficiently radiated to the outside. The exposed portion of the stator holding portion 8 is preferably disposed in an upper portion on the radially outer surface than the position to which the stator 2 is fixed. With such a configuration, while the strength for holding the motor supporting portion 4 by the coupling member 14 is maintained, the heat from the stator 2 can be efficiently radiated. However, the position in which the exposed portion of the stator holding portion 8 is not specifically limited, but it is sufficient that the metal member is exposed in at least a portion of the radially outer surface of the stator holding portion 8.

A communicating hole may be defined in the stator holding portion 8. With such a configuration, the outer joining portion 10b and the inner joining portion 10c can be continuously defined with one another via the communicating hole.

Next, with reference to FIG. 1, the configuration of the impeller 7 with respect to the rotor holding portion 6 will be described. In order to provide vibration resistance of the rotor holding portion 6, the rotor holding portion 6 is preferably constructed by a rigid material, such as, for example, a metal member.

The rotor holding portion 6 has a hollow cylindrical shape. In an upper end of the rotor holding portion 6, a flange portion 6f which projects radially outwards is provided. To the rotor holding portion 6, an impeller cup 15 defining the impeller 7 is preferably integrally provided by, for example, insert molding. Specifically, the impeller 7 is defined by a basal portion 16 coupled to the rotor holding portion 6, the impeller cup 15 extending outwards and downwards from an upper end of the basal portion 16, and a plurality of blades 17 provided in a spaced apart manner in the circumferential direction on an outer circumferential surface of the impeller cup 15. The impeller cup 15 is arranged on the outside of the stator 2.

With such a configuration, the rotor holding portion 6 can more firmly support the impeller cup 15. In addition, the position of the impeller cup 15 can be determined with respect to the rotor holding portion 6, so that the concentricity between the impeller 7 and the rotor holding portion 6 can be improved.

The basal portion 16 preferably includes an outer portion 16e firmly fixed to the upper portion of the outer circumference of the rotor holding portion 6 and the flange portion 6f, and an inner portion 16i firmly fixed to the lower portion of the inner circumference of the rotor holding portion 6. The outer portion 16e and the inner portion 16i are connected through the communicating hole 18 formed in the middle portion of the rotor holding portion 6.

The bearing 5 is preferably provided by, for example, a pair of ball bearings separately arranged at an upper position and a lower position in the axial direction. The pair of ball bearings preferably includes an upper bearing 5a in an upper position in the axial direction, and a lower bearing 5b in a lower position in the axial direction. The upper bearing 5a is arranged to abut against the upper end surface of the inner portion 16i by a compression spring 5s. An upper end of the lower bearing 5b abuts against the lower end surface of the inner portion 16i, and a lower end thereof abuts against the cylindrical portion 11 of the shaft holding portion 9. That is, in the rotor holding portion 6, in a portion between the upper bearing 5a and the lower bearing 5b, the inner portion 16i is provided on the radially inner side. The rotor magnet 1 is fitted into the rotor holding portion 6 from below, and is fixed in such a manner that the upper end of the rotor magnet 1 is arranged to abut against the lower end surface of the outer portion 16e.

With such a configuration, by the outer portion 16e, the position of the rotor magnet 1 can be determined with respect to the rotor holding portion 6. In addition, by the inner portion 16i, the positions of the upper bearing 5a and the lower bearing 5b can be determined with respect to the rotor holding portion 6. Moreover, the outer portion 16e and the inner portion 16i can be continuously defined by the communicating hole 18 provided in the rotor holding portion 6. By the rotor holding portion 6, the magnetic path of the rotor magnet 1 can be ensured.

In addition, the inner circumferential surface of the inner portion 16i of the basal portion 16 includes a tapered surface in which the inner diameter is gradually reduced from one end to the other end. With such a configuration, the inner portion 16i can be easily pulled out from a die in the process of insert molding.

In order to continuously form the outer portion 16e and the inner portion 16i, it is sufficient that the communicating hole 18 is formed in a portion between a portion abutting against the upper bearing 5a of the rotor holding portion 6 and a portion abutting against the lower bearing 5b. In order to form the rotor magnet 1 to be as long as possible in the axial direction, it is preferred that the communicating hole 18 may be arranged in a lower end portion of the portion abutting against the upper bearing 5a of the rotor holding portion 6.

With the above-described configuration, the communicating hole 18 is positioned on the radially inner side of the upper end portion of the rotor magnet 1, and the lower end surface of the upper bearing 5a is positioned on the radially inner side of the communicating hole 18. That is, the upper bearing 5a is preferably located higher in the axial direction than the upper end of the rotor magnet 1. Accordingly, it is possible to arrange the upper bearing 5a and the lower bearing 5b in a separate manner in the axial direction, so that it is possible to increase the distance between the bearings with respect to the magnetic circuit, i.e., the stator 2 and the rotor magnet 1. As described above, the axial distance between the bearings is preferably long so that both the vibration caused by the unbalance of the body of rotation can be reduced and the strength of bearings can be increased.

Preferably, an annular metal member 19 is provided in the axially lower end portion of the impeller cup 15. By providing the annular metal member 19 it is possible to increase the strength of the impeller cup. The annular metal member 19 is preferably joined to the impeller cup 15 by, for example, being embedded therein through insert molding. With such a configuration, the annular metal member 19 can be accurately positioned so that good rotation balance of the impeller 17 can be realized.

Figure 2:
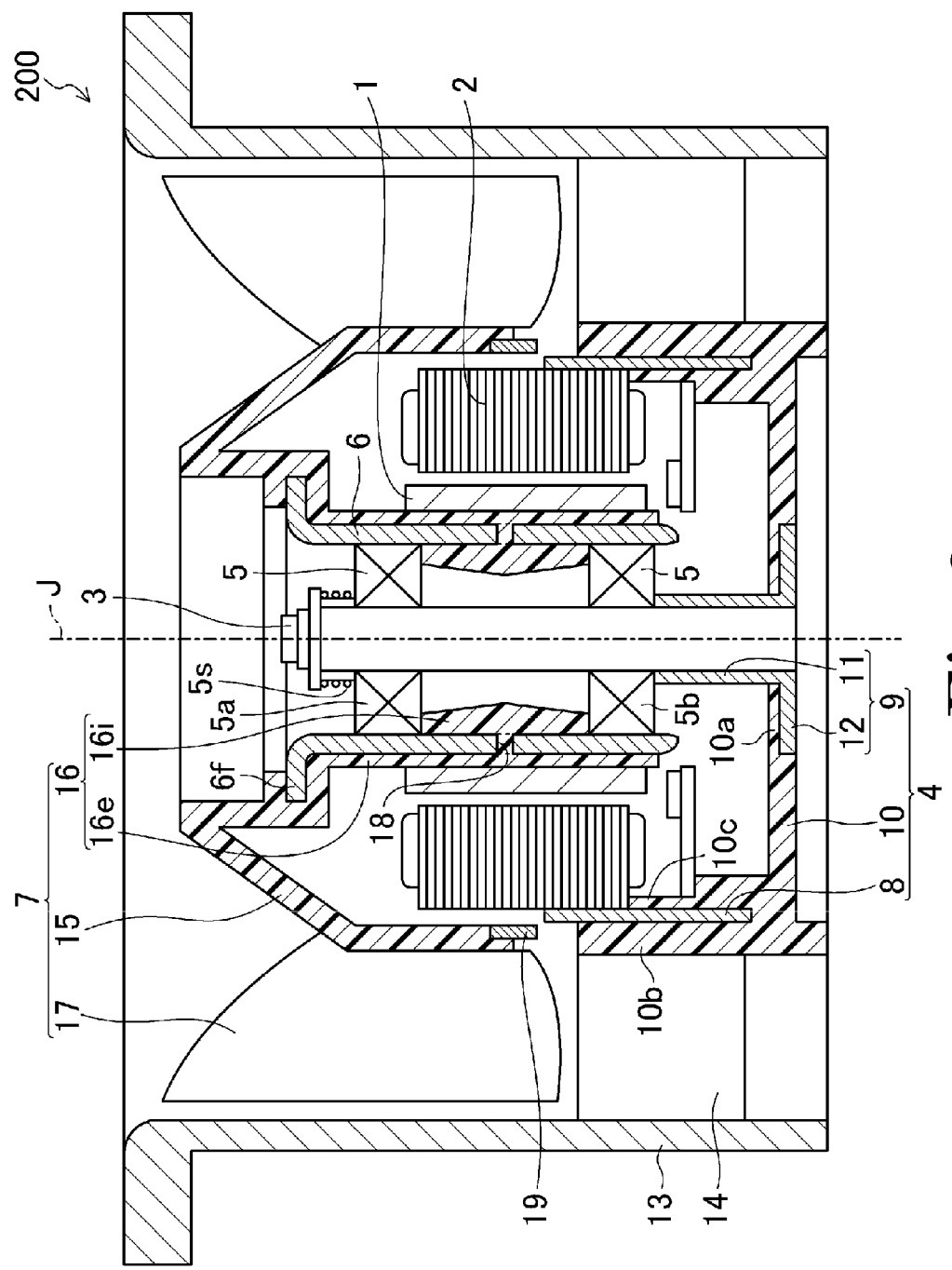
FIG. 2 is a longitudinal sectional view schematically showing the configuration of a ventilation fan of a second preferred embodiment of the present invention.

Next, with reference to FIG. 2, a ventilation fan 200 of a second preferred embodiment will be described. FIG. 2 is a longitudinal sectional view schematically showing the ventilation fan 200. The ventilation fan 200 is different from the ventilation fan 100 of the first preferred embodiment in the position of the communicating hole 18 provided in the rotor holding portion 6, and in that the rotor magnet 1 is fixed to the rotor holding portion 6 via the outer portion 16e of a resin layer. The other configurations are the same.

As shown in FIG. 2, in the rotor holding portion 6 in the ventilation fan 200, a communicating hole 18 is provided in a portion between the upper bearing 5a and the lower bearing 5b. In addition, on the radially outer side of the rotor holding portion 6, an outer portion 16e is entirely defined by the portion abutting against the upper bearing 5a to the portion abutting about the lower bearing 5b. The rotor magnet 1 is held by the rotor holing portion 6 via the outer portion 16e. Similarly to the ventilation fan 100, in the ventilation fan 200, on the radially inner side of the rotor holding portion 6, an inner portion 16i is also arranged in a portion between the upper bearing 5a and the lower bearing 5b via the communicating hole 18.

With the above-described configuration, the rotor magnet 1 can be provided on the axially upper side than the communicating hole 18, so that the length in the axial direction of the rotor magnet 1 can be increased as compared with that in the first preferred embodiment.

Figure 3:
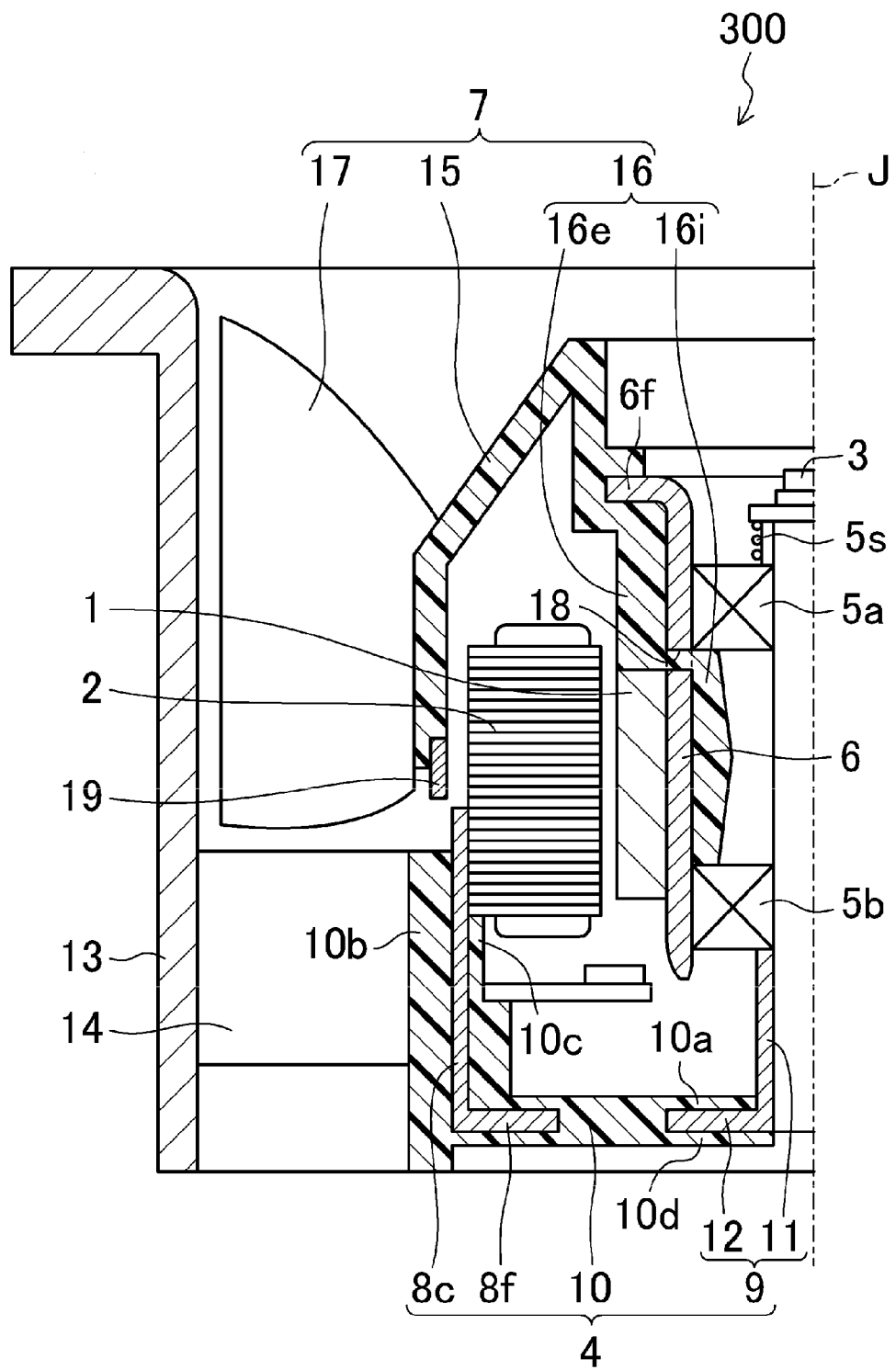
FIG. 3 is a longitudinal sectional view schematically showing a portion of the configuration of a ventilation fan of a third preferred embodiment of the present invention.

Next, with reference to FIG. 3, a ventilation fan 300 of a third preferred embodiment will be described. FIG. 3 is a longitudinal sectional view schematically showing a portion of the configuration of the ventilation fan 300. The ventilation fan 300 is different from the ventilation fan 100 of the first preferred embodiment in the shape of the stator holding portion 8, and in the location of the resin of the base portion 10, but the other configurations are the same as those of the ventilation fan 100 of the first preferred embodiment.

As shown in FIG. 3, the stator holding portion 8 of the ventilation fan 300 includes a cylindrical portion 8c having a hollow cylindrical shape extending in the axial direction, and a flange portion 8f extending radially inwards from the lower end of the cylindrical portion 8c. The stator 2 is preferably fixed to the inner circumferential surface of the cylindrical portion 8c of the stator holding portion 8 through, for example, press fitting, adhesion, etc. Specifically, the stator holding portion 8 is arranged to hold the outer circumference of the stator 2 and to extend in the axial direction, and the lower end of the stator holding portion 8 extends inwards in the radial direction. With such a configuration, the stator holding portion 8 and the base portion 10 are more firmly fixed and combined together, so that the holding stability of the stator 2 can be increased.

As shown in FIG. 3, the base portion 10 preferably includes a flange stopper 10a joined to the upper surface of the shaft holding flange portion 12, and a flange bracket 10d joined to the lower surface of the shaft holding flange portion 12. With such a configuration, the shaft holding flange portion 12 is gripped by the flange stopper 10a and the flange bracket 10d. Accordingly, the combining strength between the shaft holding portion 9 and the base portion 10 can be increased, and the shaft 3 can be more firmly supported by the shaft holding portion 9. Alternatively, the shaft holding flange portion 12 may include a communicating hole (not shown) arranged to connect the upper and lower resin layers (i.e., the flange stopper 10a and the flange bracket 10d).

Similarly, in order to increase the strength of combination between the stator holding portion 8 and the base portion 10, resin layers are preferably provided by the base portion 10 on the upper and lower surfaces of the flange portion 8f of the stator holding portion 8. Alternatively, in order to connect the upper and lower resin layers, a communicating hole (not shown) may be provided in the flange portion 8f.

Figure 4:
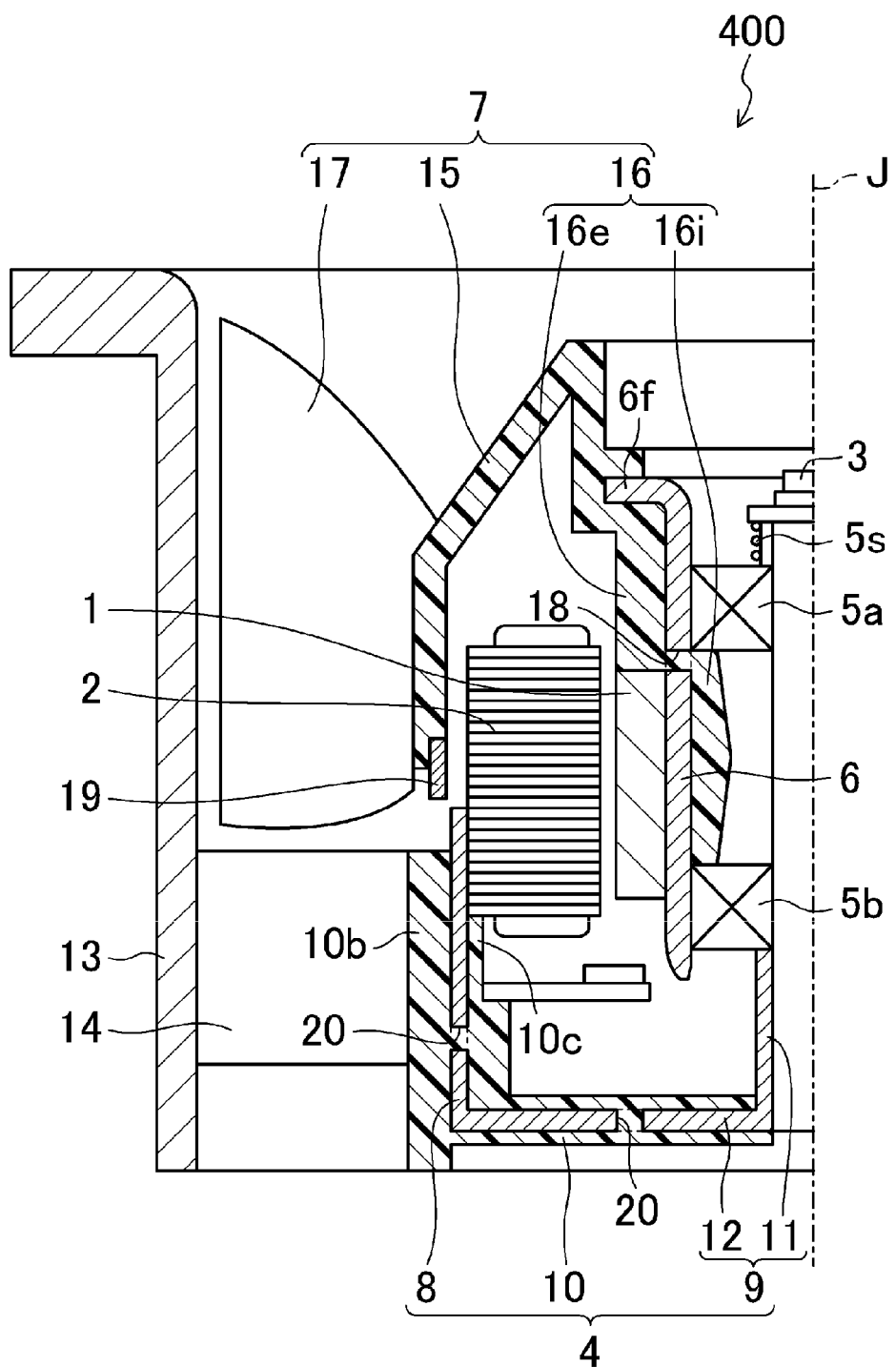
FIG. 4 is a longitudinal sectional view schematically showing a portion of the configuration of a ventilation fan of a fourth preferred embodiment of the present invention.

Next, with reference to FIG. 4, a ventilation fan 400 of a fourth preferred embodiment will be described. FIG. 4 is a longitudinal sectional view schematically showing a portion of the configuration of the ventilation fan 400. The ventilation fan 400 is different from the ventilation fan 100 of the first preferred embodiment in the shapes of the stator holding portion 8 and the shaft holding portion 9 and the arrangement of the resin of the base portion 10, but the other configurations are the same.

As shown in FIG. 4, in the ventilation fan 400, the shaft holding flange portion 12 further extends outwards in the radial direction so as to be connected to the lower end of the stator holding portion 8. That is, in the ventilation fan 400 of the fourth preferred embodiment, the stator holding portion 8 and the shaft holding portion 9 are preferably provided by one continuous monolithic metal member.

The base portion 10 is connected at least to the upper surface of the shaft holding flange portion 12, and preferably, as shown in FIG. 4, is arranged to be connected to the upper and lower surfaces of the shaft holding flange portion 12 via the communicating hole 20 defined in the shaft holding flange portion 12. In addition, as shown in FIG. 4, the communicating hole 20 is also provided in the stator holding portion 8, and the resin layer is continuously arranged on the outer circumference and the inner circumference (that is, the outer joining portion 10b and the inner joining portion 10c) of the stator holding portion 8.

With such a configuration, the shaft 3 can be held by a larger member, so that the shaft holding strength is high. In addition, since the shaft 3 is preferably held by one continuous monolithic metal member, the concentricity among the rotor magnet 1, the stator 2, and the shaft 3 can be enhanced.

Figure 5:
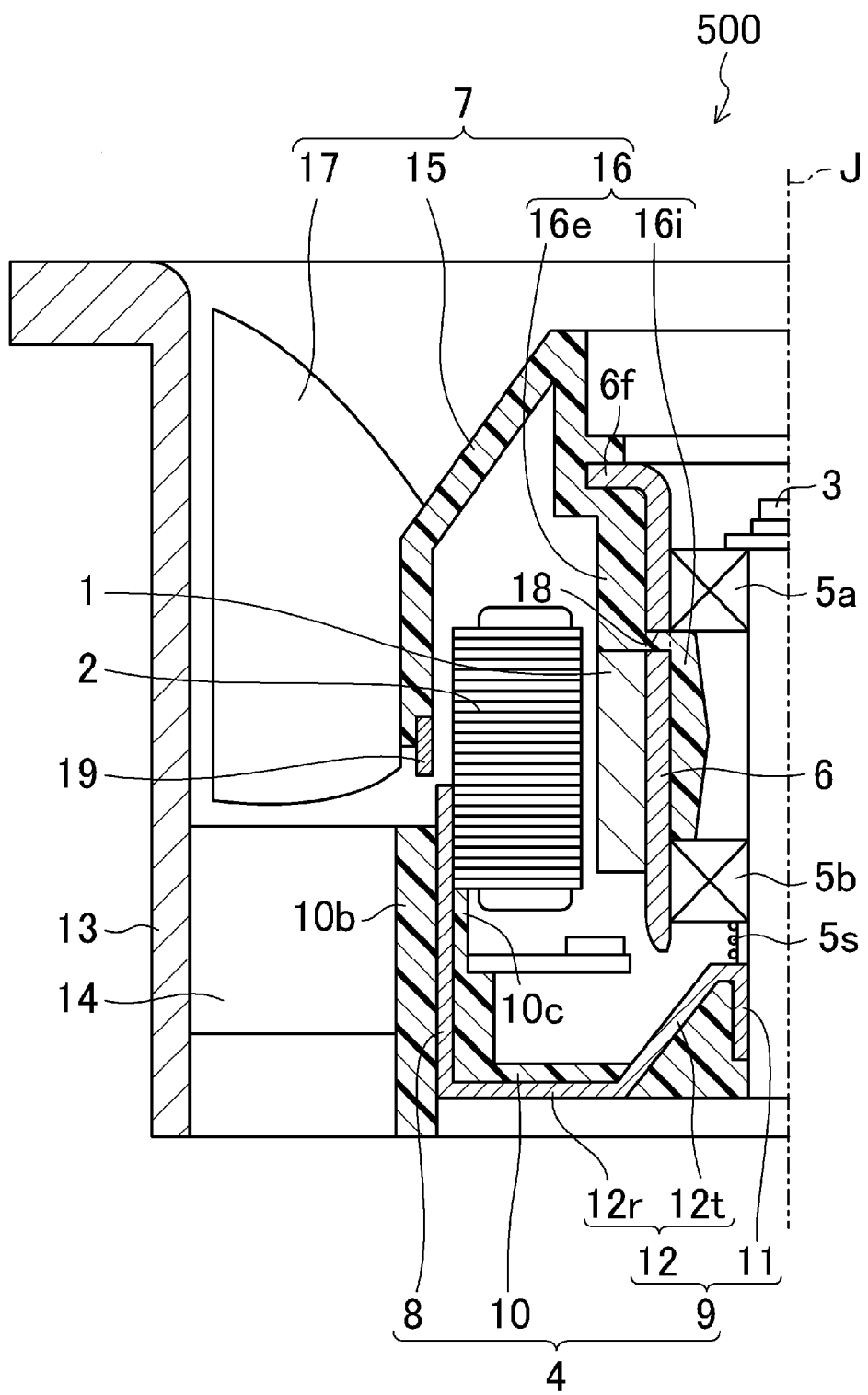
FIG. 5 is a longitudinal sectional view schematically showing a portion of the configuration of a ventilation fan of a fifth preferred embodiment of the present invention.

Next, with reference to FIG. 5, a ventilation fan 500 of a fifth preferred embodiment of the present invention will be described. FIG. 5 is a longitudinal sectional view schematically showing a portion of the configuration of the ventilation fan 500.

As shown in FIG. 5, in the ventilation fan 500, the shaft holding flange portion 12 preferably includes an inclined portion 12t extending outwards in the radial direction in an angled manner from the axially upper end toward the axially lower end of the cylindrical portion 11, and an annular portion 12r extending outwards in the radial direction from the outer circumference of the inclined portion 12t and coupled to the lower end of the stator holding portion 8. Specifically, in the ventilation fan 500 of the fifth preferred embodiment, the stator holding portion 8 and the shaft holding portion 9 are preferably provided by one continuous monolithic metal member.

The base portion 10 is defined at least on the upper surface of the annular portion 12r, and is arranged so as to join the outer circumferential surface of the cylindrical portion 11 of the shaft holding portion 9 and the outer circumferential surface of the shaft 3 lower than the cylindrical portion 11. As shown in FIG. 5, the compression spring 5s is arranged to abut against the upper end of the cylindrical portion 11 of the shaft holding portion 9. The lower bearing 5b is pressed against the lower end surface of the inner portion 16i by way of the compression spring 5s.

With the above-described configuration, due to the inclined portion 12t of the shaft holding flange portion 12, the rigidity of the shaft holding portion 9 can be enhanced. Thus, if the axial size of the cylindrical portion 11 is shortened, the shaft 3 can be firmly held. Accordingly, in the ventilation fan 500 of the fifth preferred embodiment, the shaft 3 can be short, which is useful for the miniaturization of the ventilation fan.

In FIG. 5, the stator holding portion 8 and the shaft holding portion 9 are preferably provided by one continuous monolithic metal member. Alternatively, in order to enhance the rigidity of the cylindrical portion 11, the annular portion 12r and the stator holding portion 8 may not be continuous, i.e., the stator holding portion 8 and the shaft holding portion 9 may be provided by separate metal members.

As described above, preferred embodiments of the present invention are useful in a ventilation fan mounted on electronic equipment for which the miniaturization is required.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ventilation fan comprising:
a shaft arranged on a center of rotation of the ventilation fan;
a rotor holding portion rotatably supported about the shaft via a bearing;
a rotor magnet held on a radially outer surface of the rotor holding portion;
a stator arranged opposite to the rotor magnet on the radially outer side of the rotor magnet;
an impeller arranged to rotate together with the rotor magnet and the rotor holding portion; and
a motor supporting portion arranged to support the stator and the shaft; wherein
the motor supporting portion includes a base portion, a stator holding portion arranged to hold the stator, and a shaft holding portion arranged to hold the shaft;
the base portion is made from a resin material, and the stator holding portion and the shaft holding portion are each provided by metal members;
the stator holding portion and the shaft holding portion are embedded within the base portion;
the shaft holding portion includes a cylindrical portion into which the shaft is inserted, and a shaft holding flange portion extending outwards in the radial direction from either one of an upper end or a lower end of the cylindrical portion;
at least a portion of the shaft is directly held by the shaft holding portion such that the shaft does not rotate;
the impeller includes a substantially cylindrical impeller cup supported by the rotor holding portion and a plurality of blades arranged on an outer circumference of the impeller cup; and
the rotor holding portion is embedded within the impeller cup.

2. A ventilation fan according to claim 1, wherein the shaft holding portion and the stator holding portion are provided by individual and separate metal members.

3. A ventilation fan according to claim 2, wherein the stator holding portion is arranged to hold an outer circumference of the stator and to extend in the axial direction, and a lower end of the stator holding portion extends inwards in the radial direction.

4. A ventilation fan according to claim 1 wherein the shaft holding portion and the stator holding portion are provided by one continuous monolithic metal member.

5. A ventilation fan according to claim 1, wherein the shaft holding flange portion includes an inclined portion which extends outwards in the radial direction in an angled manner from an axially upper end toward an axially lower end of the cylindrical portion.

6. A ventilation fan according to claim 1, wherein the base portion is provided on an upper surface of the shaft holding flange portion.

7. A ventilation fan according to claim 5, wherein the inclined portion is connected to a lower end portion of the stator holding portion.

8. A ventilation fan according to claim 1, wherein
a communicating hole is provided in at least either one of the shaft holding flange portion or the stator holding portion; and
through the communicating hole, the resin material of the base portion is integrally provided on at least either one of both upper and lower axial surfaces of the shaft holding flange portion or both upper and lower axial surfaces of the stator holding portion.

9. A ventilation fan according to claim 1, wherein a resin layer is arranged on a radially outer side of the stator holding portion, and a plurality of coupling members are integrally provided with the motor supporting portion on the radially outer side of the resin layer as a single monolithic member.

10. A ventilation fan according to claim 8, wherein at least a portion of a radially outer surface of the stator holding portion is not covered by the resin material of the base portion.

11. A ventilation fan according to claim 1, wherein the impeller includes a substantially cylindrical impeller cup supported by the rotor holding portion and a plurality of blades formed on an outer circumference of the impeller cup;
an annular metal member is arranged in an axially lower end portion of the impeller cup; and
the annular metal member is embedded within the impeller cup.

12. A ventilation fan according to claim 1, wherein the bearing includes an upper bearing arranged on an axially upper side and a lower bearing arranged on an axially lower side; and
a communicating hole is arranged in the lower end portion of the rotor holding portion abutting against the upper bearing, and a resin layer extends through the communicating hole on a radially inner side in the rotor holding portion in a portion between the upper bearing and the lower bearing to thereby hold the rotor magnet on a radially outer side.

13. A ventilation fan according to claim 12, wherein the communicating hole is positioned on a radially inner side of an upper end portion of the rotor magnet.

14. A ventilation fan according to claim 12, wherein an inner circumferential surface of the resin layer includes a tapered surface of which the diameter is gradually decreased vertically in the axial direction from the vicinity of the center in the axial direction.

15. A ventilation fan according to claim 1, wherein the bearing includes an upper bearing arranged on an axially upper side and a lower bearing arranged on an axially lower side,
in the rotor holding portion, a communicating hole is provided in a portion between a portion abutting against the upper bearing and a portion abutting against the lower bearing, and a resin layer is continuously provided through the communicating hole on a radially inner side and a radially outer side; and
the rotor magnet is held by the rotor holding portion by the resin layer arranged on the radially outer side.

16. A ventilation fan according to claim 14, wherein an inner circumferential surface of the resin layer provided on the radially inner side of the communicating hole includes a tapered surface of which the diameter is gradually decreased vertically in the axial direction from the vicinity of the center in the axial direction.

* * * * *